(12) United States Patent
Kitamura

(10) Patent No.: US 6,334,527 B1
(45) Date of Patent: Jan. 1, 2002

(54) BUCKET CONVEYOR

(75) Inventor: Masao Kitamura, Kyoto (JP)

(73) Assignee: Kyoji Co., Ltd., Kyoto (JP)

( * ) Notice: Subject to any disclaimer, the term of this patent is extended or adjusted under 35 U.S.C. 154(b) by 0 days.

(21) Appl. No.: 09/799,672

(22) Filed: Mar. 7, 2001

Related U.S. Application Data

(62) Division of application No. 09/075,865, filed on May 12, 1998.

(30) Foreign Application Priority Data

| May 14, 1997 | (JP) | ............................................. 9-140837 |
| Aug. 1, 1997 | (JP) | ............................................. 9-221047 |
| Feb. 23, 1998 | (JP) | ............................................. 10-58986 |

(51) Int. Cl.$^7$ .............................................. B65G 47/40
(52) U.S. Cl. .................... 198/704; 198/477.1; 198/706; 198/526; 198/707; 198/713
(58) Field of Search ................................ 198/702–707, 198/710, 477.1, 526, 713

(56) References Cited

U.S. PATENT DOCUMENTS

| 146,315 A | | 1/1874 | Christensen | |
| 385,786 A | * | 7/1888 | Bartliff | ........................ 198/702 |
| 437,506 A | | 9/1890 | Otten | |
| 545,200 A | * | 8/1895 | Horst | ........................ 198/702 |
| 565,334 A | | 8/1896 | Dodge | |
| 585,693 A | * | 7/1897 | Notter | ........................ 198/704 |
| 630,799 A | * | 8/1899 | Decker | ........................ 198/704 |
| 645,171 A | | 3/1900 | Heffner | |
| 667,192 A | | 2/1901 | Craig | |
| 799,489 A | | 9/1905 | O'Donnell | |
| 998,678 A | | 7/1911 | Dowling | |
| 1,922,970 A | * | 8/1933 | McKenny | ........................ 198/704 |
| 3,112,822 A | | 12/1963 | Mayfarth, Jr. | |
| 3,480,131 A | | 11/1969 | Holloway | |
| 3,842,967 A | | 10/1974 | Davis | ........................ 198/526 |
| 4,805,780 A | * | 2/1989 | Solund | ........................ 198/706 |

FOREIGN PATENT DOCUMENTS

| AU | 229165 | | 7/1959 | |
| BE | 658685 | | 1/1965 | |
| DE | 580957 | | 4/1932 | |
| DE | 43 23 634 A1 | | 1/1994 | |
| FR | 1507991 | | 3/1968 | |
| GB | 619009 | * | 3/1949 | ................. 198/706 |
| GB | 720533 | | 12/1954 | |
| JP | 64-36312 | | 6/1989 | |
| JP | 06072519 | | 3/1994 | |
| JP | 06072519 A | | 3/1994 | |

* cited by examiner

*Primary Examiner*—Donald P. Walsh
*Assistant Examiner*—Mark A. Deuble
(74) *Attorney, Agent, or Firm*—Finnegan, Henderson, Farabow, Garrett & Dunner, L.L.P.

(57) ABSTRACT

A bucket conveyor for conveying loose grain in different directions, comprising a bucket having: an opening leading to the interior of the bucket; and a dead space constituting part of the interior at the rear, the space not filled with loose grain when grain is loaded from above to or beyond the level of the opening, its volume being larger than the filled volume immediately below the opening. The conveyor does not spill the loose grain even when the angle of the bucket is changed.

5 Claims, 14 Drawing Sheets

F I G. 8
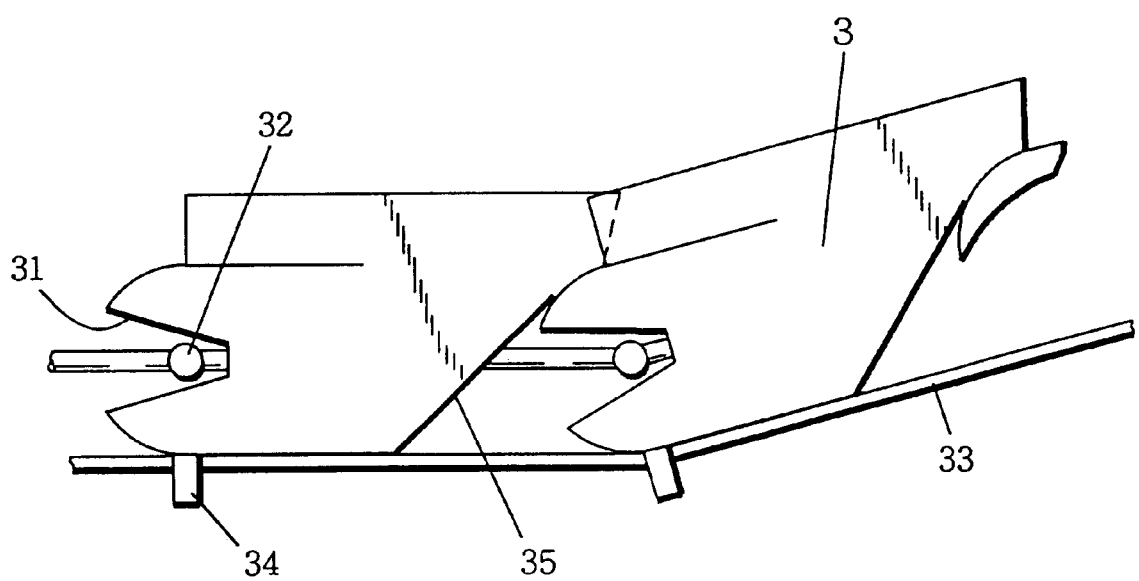

BUCKET CONVEYOR

This is a division of application Ser. No. 09/075,865, filed May 12, 1998 incorporated herein by reference.

TECHNICAL FIELD

This invention relates to a bucket conveyor. This bucket conveyor is suitable for conveying loose rice, wheat, beans or other farm product (hereinafter, "loose grain") horizontally, at an incline or vertically.

BACKGROUND ART

For some time, V-Bucket Conveyor and Pivoted Bucket Conveyor have been known as equipment for continuously conveying loose grain from horizontal to vertical direction. With the V-Bucket Conveyor, the opening of the bucket is always perpendicular to the direction of conveyance and the bucket travels through a trough in the horizontal direction to scoop up the loose grain. Accordingly, friction between the bucket and trough is high which causes high dynamic loss. Also, the loose grain is easily damaged and split open. With the Pivoted Bucket Conveyor, the bucket is attached to the chain by a pin, therefore the opening of the bucket faces upwards no matter where the bucket is located. Accordingly, a mechanism is needed to flip the bucket over at the unloading point and, because the flip roller, cam and bucket are subjected to considerable shock, structure and materials must be designed against shock. Moreover, conveying speed is limited because of the flip operation. And, if the loose grain is not loaded in the center of the bucket, the bucket will tilt and spill the grain. Therefore, a device is needed to control the relative positions of the loading port and the bucket.

A bucket conveyor having a rectangular parallelepiped bucket with a 45° angle opening attached to a chain has been proposed for this purpose (Japanese Utility Model Appln. Laid-Open No.36312/1989). When using this conveyor to transport loose grain, grain gathered under the lower part of the conveyor is scooped up by the bucket on it's return trip. On the forwarding trip, the opening faces diagonally upward both in horizontal conveyance and vertical conveyance, and loose grain is filled up to the diagonal line of the square bucket, thus ½ way full. On the returning trip, the opening faces diagonally downward, therefore the bucket dumps the loose grain.

Other type of bucket conveyor having cylindrical or spherical buckets with a similar 45° angle opening, which are attached into a continuous gapless train has been proposed (Japanese Pat. Appln. Laid-Open No. 072519/1994). When using this conveyor to transport loose grain, grain is poured from above the bucket and slid along the rear end of the preceding bucket to fall into the opening. Therefore, in addition to the same filling and dumping capacities of the aforementioned proposal, this conveyor has the advantage that loose grain can be loaded continuously.

With the conveyor described in Japanese Utility Model Appln. Laid-Open No.36312, the loose grain gathered under the conveyor is not completely scooped up. Moreover, loose grain is subjected to shock in the scooping process which damages the grain or splits it open.

With the conveyor described in Japanese Pat. Appln. Laid-Open No.072519, the bucket is only filled ½ full so as not to overflow. Accordingly, it is necessary to control speed of loading the bucket in line with the conveyance speed of the conveyor. Of course, when power is lost, the conveyor stops because the control device stops working. However despite this, the loading port remains open and loose grain is loaded continuously until overflowing. In this state, when the conveyor is restarted, loose grain is spilled when the bucket angle changes. The spilt grain piles up on the bottom of the conveyor which makes it harder to drive the conveyor. Furthermore, it is very troublesome to clean up spilled grain because there is little space between the conveyor case and bucket.

SUMMARY OF THE INVENTION

It is an object of this invention to provide a novel conveyor for continuously conveying loose grain in different directions, such as changing from the horizontal to the vertical direction. A further object is to fill a bucket without damaging the grain before conveyance in different directions.

To achieve the objects of this invention, the conveyor comprises a bucket which has an opening at the front and a dead space at the rear. The opening leads to the interior of the bucket. The space is not filled with loose grain when grain is loaded from above to or beyond the level of the opening; and its volume is larger than the filled volume immediately below the opening.

BRIEF DESCRIPTION OF DRAWINGS

FIG. 8 is a front sectional view of the conveyor;

DETAILED DESCRIPTION OF THE INVENTION

Figure 1:
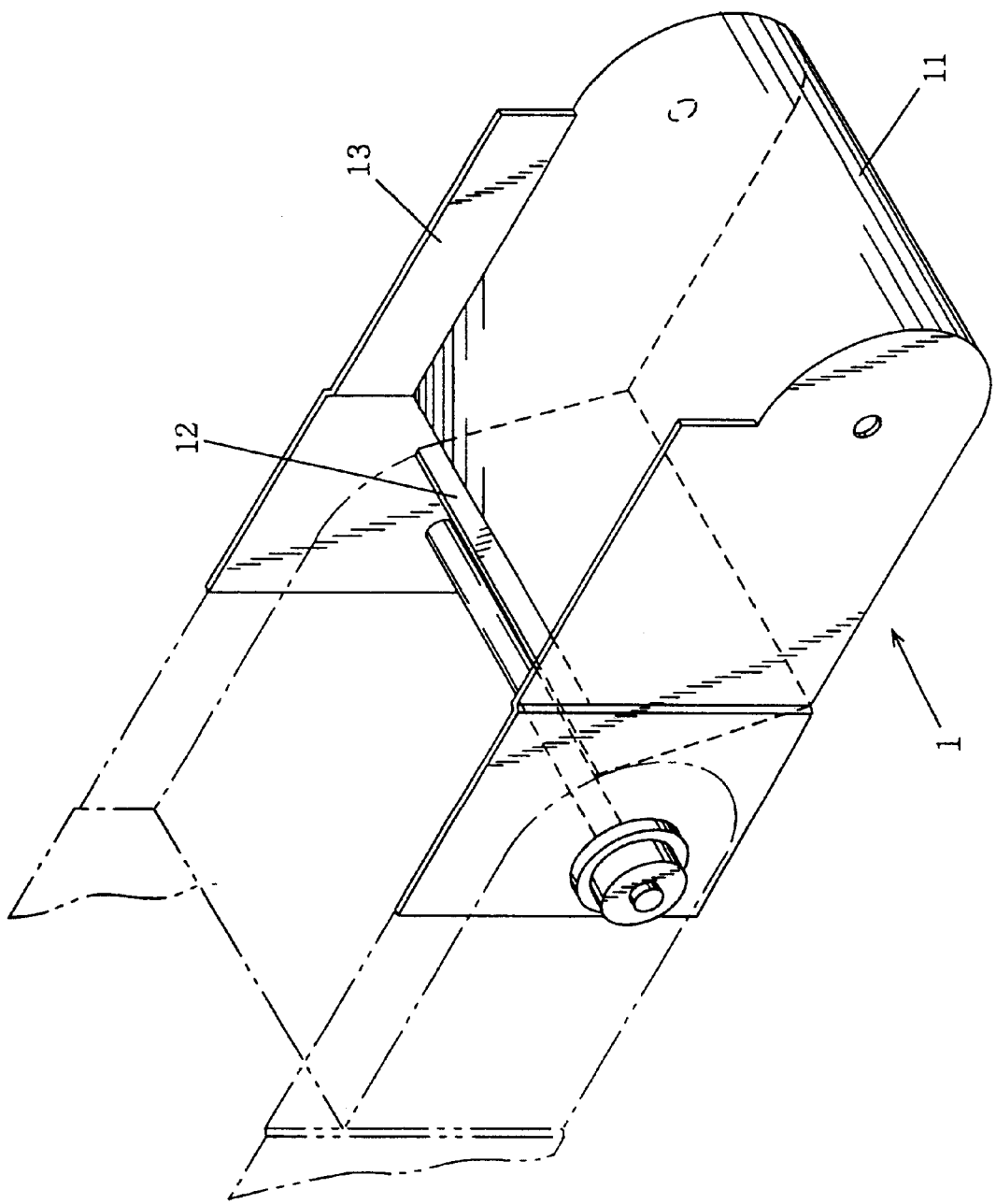
FIG. 1 is a perspective view of the bucket used with an embodiment of the bucket conveyor of this invention.

This invented conveyor does not spill the loose grain when the angle of the bucket is changed, even when the bucket has been completely filled in appearance, because the grain that was filled to a space immediately below the opening before the bucket's angle is changed falls into the dead space. Accordingly, it is possible to change the direction of conveyance from horizontal to vertical while the bucket is full of loose grain. And, it is possible to position the loose grain loading port directly over the bucket and fill the bucket under the weight of the loose grain because the bucket does not spill the grain even when full. As a result, the grain is not damaged by the bucket.

Loose grain is not spilled even when the bucket is full. For this reason, the conveyor case is not littered with spilt grain on the inside. And, the conveyor can resume operation immediately after being stopped without having to control grain loading speed.

The bucket in this invention idealy has a round rear end surface centered on a shaft perpendicular to the plane of the direction of conveyance, and a front end surface which slides in such way that it closes the clearance formed with the rear end of the preceding bucket. Though it is not important whether the opening is planar to the direction of conveyance, part of the rear end surface of the preceding bucket also serves as a part of the front end surface of the following bucket because the bucket is shaped as previously described. Accordingly, the buckets can be connected in series, which improves conveyance efficiency.

The aforementioned front end of the following bucket idealy has a sloped surface that contacts the upper half of the rear end surface of the preceding bucket. As such, loose grain slides on the front end surface to be filled completely to the rear except for the dead space when loading, and dumped fast when unloading.

The bucket in this invention idealy has an apron which extends perpendicularly to the opening and ahead of the front end surface. This apron is connected to the preceding bucket by a common rotating shaft. Because height of the apron exceeds the opening, loose grain does not spill even when the bucket is filled slightly higher than the level of the opening. And, because the apron is connected to the preceding bucket by a common rotating shaft, loose grain does not spill even when the bucket is filled slightly higher than the level of the opening when the rear end surface of the preceding bucket also serves as the front end surface of the following bucket.

This invented conveyor is idealy equipped with a drive transmission mechanism for endless motion, parallel to a part of the endless path of buckets. By doing so, it is possible to distribute drive power to multiple buckets without applying excessive load to the drive transmission mechanism. This differs from the conventional Pivoted bucket Conveyor and V-Bucket Conveyor, in that the chain that links the buckets is driven by a sprocket and all load is applied to the sprocket pin, therefore the pin is easily worn down.

The bucket used with this invented conveyor may have holes on the front end and rear end for a hinge pin. The holes complement the length in the shaft direction. As such, the hinge pin hole on the rear end of the preceding bucket and the hinge pin hole on the front end of the following bucket form concentric circles and it is possible to securely link the preceding bucket to the following bucket by passing the hinge pin through the holes.

To achieve the above object, the second invented conveyor which is related to this invention comprises a bucket which has an introduction with opening and a main body with dead space, connected rotationally to the introduction, and is further equipped with guide rails, stationary rail and mobile rail.

The guide rails are located on both sides of the bucket, supporting and guiding conveyance of the bucket. Because the guide rails are situated on both sides of the bucket, the bucket can smoothly change angle. The stationary rail is located under the bucket. This rail is straight in non-unloading position so as to keep the bucket body planar to the direction of conveyance. In unloading position, this rail continues to support the bucket body and forms a sinusoidal curve so that the body can rotate on the aforementioned rotating shaft. Accordingly, the bucket travels smoothly over the stationary rail while unloading its contents as well as when not. For this reason, it is not necessary to lower conveyance speed when unloading the contents.

The mobile rail is adjacent to a linear extension of the stationary rail. It substitutes for the stationary rail in the unloading position when unloading is unnecessary and thus keeps the bucket body planar to the direction of conveyance. The mobile rail is moved away from the linear extension position when unloading in the unloading position. When the bucket is supported by mobil rail, the bucket body moves forward without rotating. However, when the mobil rail is removed from the bucket, the bucket body is conveyed on the stationary rail and rotates at unloading position dumping the contents. Accordingly, it is possible to freely set whether to unload in the unloading position or not. And, when these rails are equipped in multiple locations, the unloading position can be selected.

The bucket may alternatively be supported by guide rail via a rotating shaft. In this case it would be desirable to have wheels on both ends of the rotating shaft. This setup minimizes friction between the rotating shaft and guide rails and allows the bucket to travel smoothly. And, the aforementioned bucket may be supported by the stationary rail or the mobile rail via roller attached to the bottom of the bucket. This setup minimizes friction between the bucket and stationary rail or mobile rail further, and allows the bucket to travel more smoothly.

The apron is attached to the introduction surface so as to overlap the sidewall of the body. The rotating shaft shared with the apron of the following bucket is attached to both sides of the body. As such, it is possible to connect all buckets into a gapless train.

To achieve the above object, the third invented conveyor which is related to this invention comprises a bucket which has an introduction with opening and a main body with dead space, connected rotationally to the introduction, and guide rails and a swing rail.

The guide rails are located on both sides of the bucket, supporting and guiding conveyance of the bucket. The swing rail is positioned pivotally on the horizontal conveyance route, so that when not unloading, it will be lowered and removed from contact with the bucket body bottom, but when unloading, it is raised to form a sinusoidal curve supporting and guiding the bucket bottom at the unloading position so that the bucket body can rotate and dump its contents. The guide rails will not hinder rotation of the bucket body, since they are situated on both sides of the bucket.

The bucket is conveyed suspended from guide rails, except when it is unloading. The buckets do not tip out contents as long as there is gapless connection between all buckets. It is also is desirable that the bucket be equipped with rollers at the bottom to come in contact with the swing rail, so that rotation of the bucket body is achieved smoothly. The bucket is preferably equipped with protruding wheel shafts on both sides of the introduction, by which it would be suspended from the guide rail, and be conveyed smoothly.

In order to eliminate the gap between the back of the preceding bucket and the introduction of the next bucket, the introductions of the preceding and following buckets can be coupled with a bar. This bar should be set permanently on the introductions, either by solder or with nut and bolt. It can also be fastened onto the wheel shaft. The bucket body may also have at the upper portion a flange extending backward to rest on the wheel shafts of the following bucket with the aid of the flange. This setup would prevent accidental spillage of contents due to unbalancing of the main body, and at the same time, any loose grains landing on the bucket upper surface will travel over the flange and slide into the next bucket without spillage.

When unloading, the swing rail is raised to come in contact with the bottom surface of the bucket. A sinusoidal curve is formed to support and guide the bucket base at the unloading position, so that the bottom will travel slower than the introduction and upper portion of the bucket body. The bucket can thus rotate and dump its contents. Unlike the second invented conveyor, there is no need for stationary rail.

To achieve the above object, the fourth invented conveyor which is related to this invention comprises the bucket of the first invented conveyor, a hopper and guide rails. The hopper can adjust the feeding port angle by rotating on a support shaft stationed outside the bucket conveyance track. The guide rails for this model are situated on both sides of the bucket to suspend the buckets for conveyance, in the shape of a circular arc with a sharp curve under the hopper.

When grain is loaded from above up to or beyond the level of the bucket opening, a dead space results, constituting part of the interior at the rear. The space not filled with loose grains has a volume larger than the filled volume immediately below the opening. The volume of this dead space is determined by the grain's angle of repose and the bucket angle. Since the angle of repose is characteristic to particular types of grains and cannot be changed, the angle of the feeding port is adjusted as above, and grain is poured into buckets that are conveyed to corresponding positions on the guide rails. The bucket will be planar to the direction of conveyance below the hopper, and tilt upward or downward in other locations. In this way, the capacity of the dead space may be adjusted by the angle of the feeding port of the hopper according to need.

DESCRIPTION OF THE PREFERRED EMBODIMENTS

Actual Embodiment 1

FIGS. 1–6 are used to explain an actual embodiment of the bucket conveyor of this invention.

As shown in FIG. 1, the bucket (1) is composed of a body (11) which has a U-shape cross-section, and a front end surface (12) which is connected on a slant to one edge of the body (11). The front end surface (12) is not attached to the body (11) except on the edge shared with the body (11). The bucket (1) has an opening for loading and unloading, which is bordered with an edge of the front end surface (12) and an edge on the opposite side of the edge shared between the body (11) and the front end surface (12). Both side surfaces of the body (11) extend vertically from the opening and forward from the front end surface (12), and serve as aprons (13). Because the aprons (13) are linked on both sides to the rear end of the preceding bucket by a rotating shaft (15), the front end surface (12) of the following bucket is flexibly contacted with pressure to the round rear end of the preceding bucket on the tangent of the round rear end. As such, the preceding bucket and following bucket can be connected into a gapless train. Accordingly, the body (11) has a hole on each side of the front and rear ends for inserting the rotating shaft (15). The bucket (1) rotates on the rotating shaft (15) when changing the direction of conveyance from horizontal to vertical and vice-versa.

Figure 2:
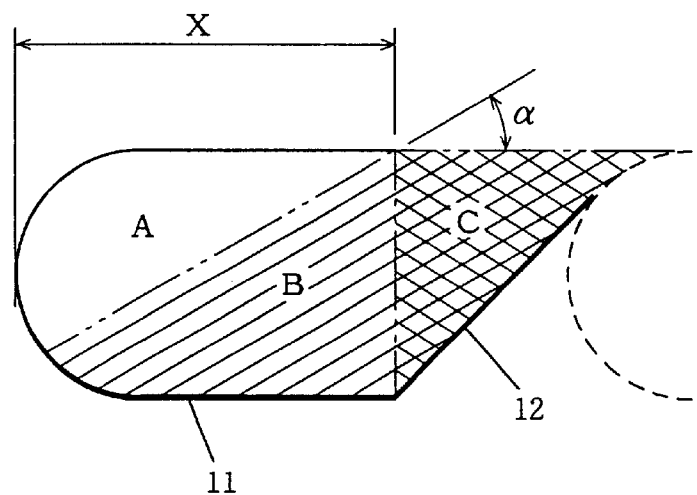
FIG. 2 is a sectional view showing the state of the loose grain when the bucket of FIG. 1 has a horizontal attitude.
Figure 3:
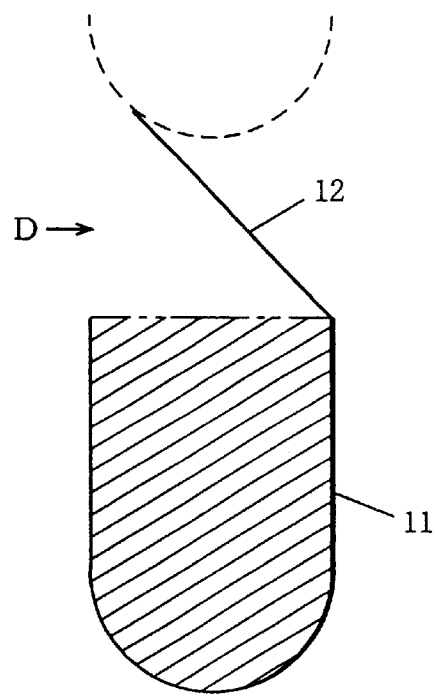
FIG. 3 is a sectional view showing the bucket in FIG. 2 when stood in the vertical direction.

When the bucket (1) is conveyed horizontally, the body (11) becomes the sideways U-shape seen in FIG. 2. It is presumed that rice is loaded into the bucket from above while the bucket has this attitude. Looking at the bucket (1) itself, the opening is not horizontal. However, because the rear end of the preceding bucket exists over most of the extended line from the front end surface (12), the rear end of the preceding bucket serves as a part of the front end of the following bucket. Accordingly, the opening is horizontal for all practical purposes. Even if rice is loaded up to the top level of opening, the space (A) determined by the angle of repose α of the rice itself and the depth X of the body (11) is dead space and is not filled with rice. If the volume of this space (A) is larger than the filled volume immediately below the opening (C), because (A+B)≧(B+C), the top surface of the rice is below the top level of the opening and the bucket (1) does not spill the rice when the bucket (1) is stood up as shown in FIG. 3 (vertical conveyance).

Figure 4:
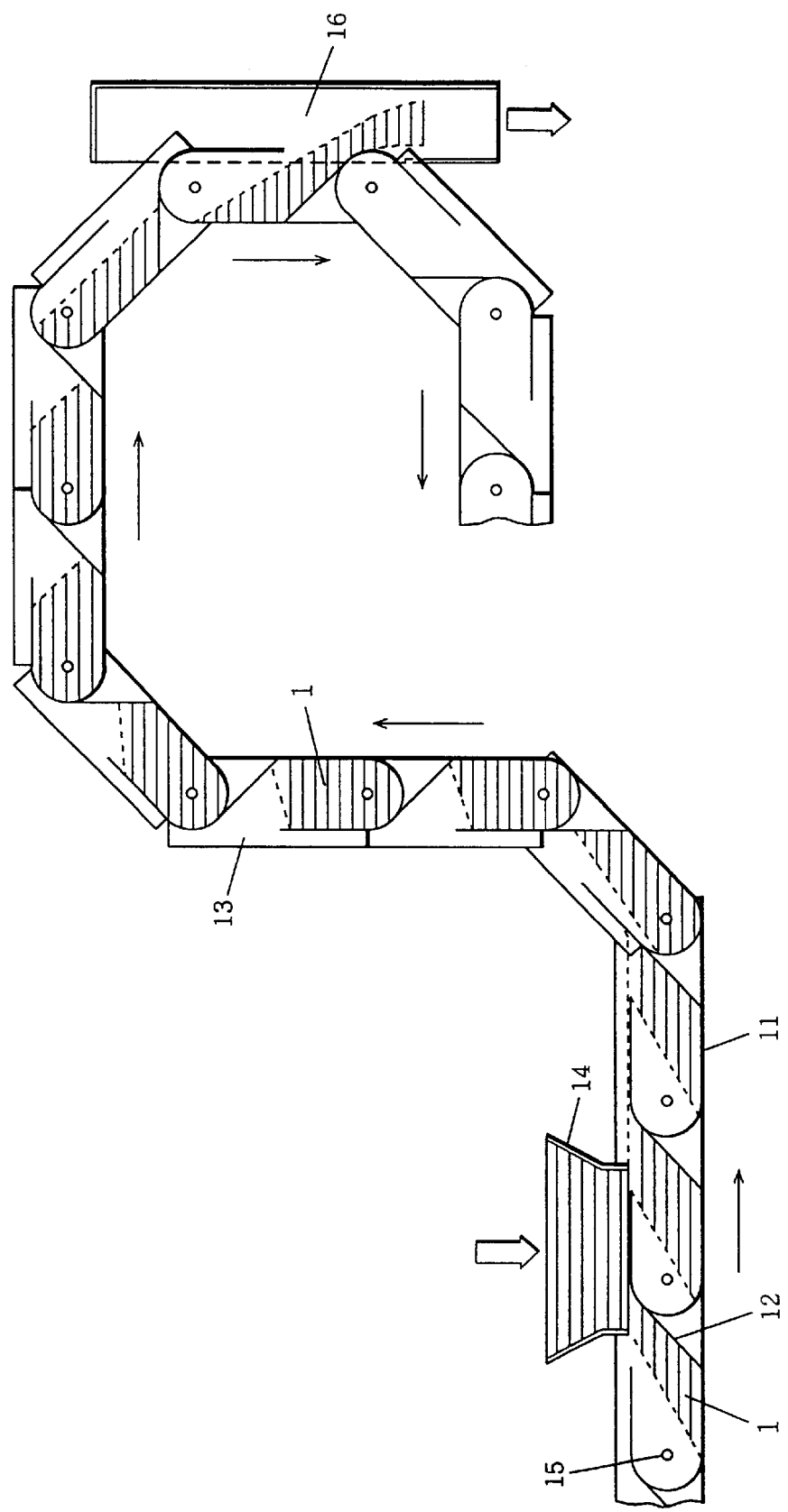
FIG. 4 is a sectional view showing how grain is conveyed using the conveyor.

The following detailed description deals with how rice is conveyed using this bucket conveyor. Referring to FIG. 4, a rice loading port (14) is provided above the horizontal conveyance forwarding route sufficiently close to the bucket (1). Rice is loaded continuously into the buckets from the loading port (14). It is not necessary to carefully control loading speed. A small quantity of rice lands on top of the body (11), however it does not fall onto the conveyor floor because the bottom edge of the loading port (14) is lower than the aprons (13). The bucket (1) rotates on the rotating shaft (15) according to the direction of conveyance. Accordingly, the rice on the top of the body (11) slides along the top surface during the vertical conveyance forwarding route and is guided into the following bucket by the aprons (13). The rice in the bucket (1) is unloaded into an unloading port (16) when the bucket comes in the vertical conveyance returning route which causes the rice to slide along the front end (12). Rice falls under its own weight both when loaded into the bucket (1) and when unloaded from the bucket (1), therefore the shock applied to the rice is minimal. For this reason, the rice is not damaged.

Figure 5:
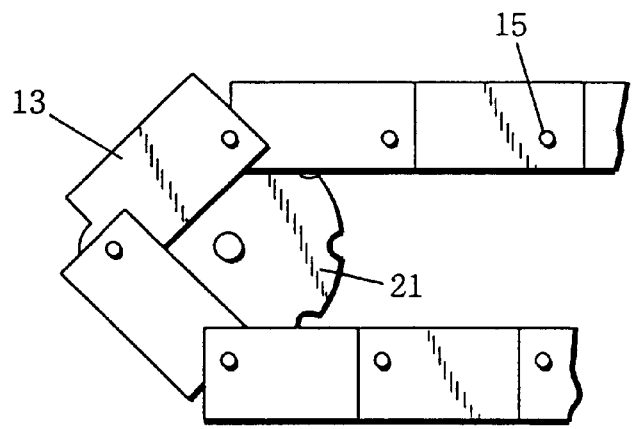
FIG. 5 is a front view of a known drive transmission means for the conveyor.

Known means can be applied for transmitting drive power to the conveyor. The typical means of transmission has a sprocket (21) at the direction changing position in the conveyance route of the conveyor, as shown in FIG. 5. In this case, drive is obtained by engaging the rotating shaft (15) of the bucket (1) to the sprocket (21). However, in this method, the load applied to the rotating shaft (15) in the direction changing position of the bucket (1) is high, thus the sprocket (21) and the rotating shaft (15) are easily worn down.

Figure 6:
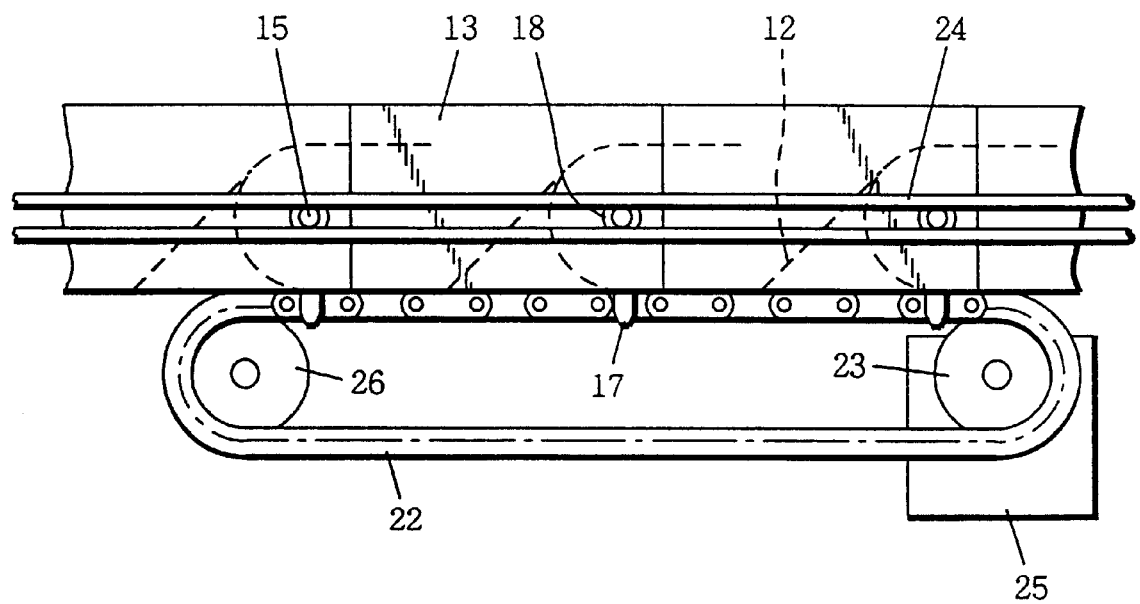
FIG. 6 is a front view of an improved drive transmission mechanism for the conveyor.

Accordingly, this invented conveyor ideally uses a drive transmission mechanism shown in FIG. 6. In this case, a hook (17) is attached to the bottom of the bucket (1) and wheels (18) are attached to both ends of the rotating shaft (15). Guide rails (24) are located along the conveyance route on both sides of bucket (1). The bucket (1) is supported by the guide rails (24) via the wheels (18) while it is being conveyed. The drive transmission mechanism consists of a chain (22) which moves endlessly parallel to a part of the endless path of bucket (1), and sprockets (23 and 26) which engage the chain (22). The chain (22) is driven by a motor (25) via one of the sprockets (23) and, while moving, it pulls the bucket (1) when the hook (17) catches the chain (22) between front and rear sprockets (23 and 26). Multiple hooks (17), (three shown in figure) are attached to the chain (22), therefore drive power is distributed and excessive force is not applied to any part. In particular, when this drive transmission mechanism is provided for both the horizontal conveyance route and the vertical conveyance route, excessive stress is not applied to the guide rails or the wheels when changing direction. Moreover, because the drive transmission mechanism is provided separately from the endless path of buckets, it can be easily added to the other preset mechanism.

Actual Embodiment 2

This embodiment differs from the bucket used in actual embodiment 1 in terms of bucket shape. With actual embodiment 1, because the body (11) has a U-shape of vertical section, the bucket (1) can only turn in the vertical direction. With this conveyor, conveyance direction can be changed to the left and right as well.

Figure 7:
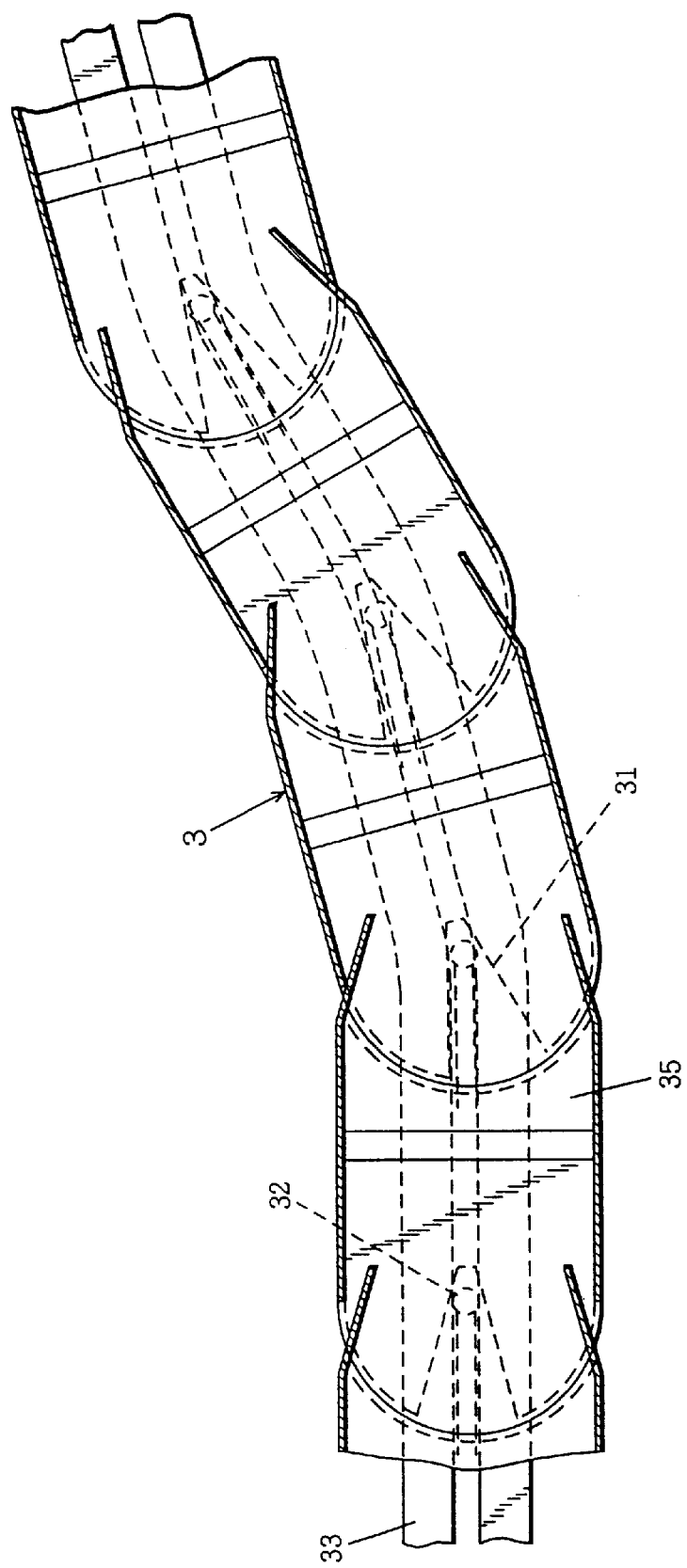
FIG. 7 is a plane-sectional view of another embodiment of the bucket conveyor of this invention.

Referring FIGS. 7 and 8, with this conveyor, the rear end of the bucket (3) is basically spherical and is indented from the farthest protruding point towards the center of the sphere. The bottom of the indent (31) is linked to the front end surface (35) of the following bucket (3) by a ball-joint (32). The front end surface (35) is curved into a round shape when seen in the plane-sectional view, so as to complement each other with the rear end surface. The guide rails (33) are located below the bucket (3). The hooks (34) attached to the bottom of the bucket (3) project between the parallel guide rails (33). As with actual embodiment 1, by having the hooks (34) engage the drive transmission mechanism (2), the bucket (3) is driven in an endless motion.

With this conveyor, not only can conveyance direction be changed from horizontal to vertical as shown in FIG. 8, but to the left and right as shown in FIG. 7. Because the buckets (3) are respectively linked by ball-joints (32), the buckets (3) do not separate from one another during conveyance. Accordingly, the rotating shaft (15) used in actual embodiment 1 is unnecessary.

Actual Embodiment 3

With actual embodiment 1, the unloading position is limited to a point in the returning route where the bucket is turned. Unlike actual embodiment 1, the unloading position of this conveyor can be set randomly.

Figure 9:
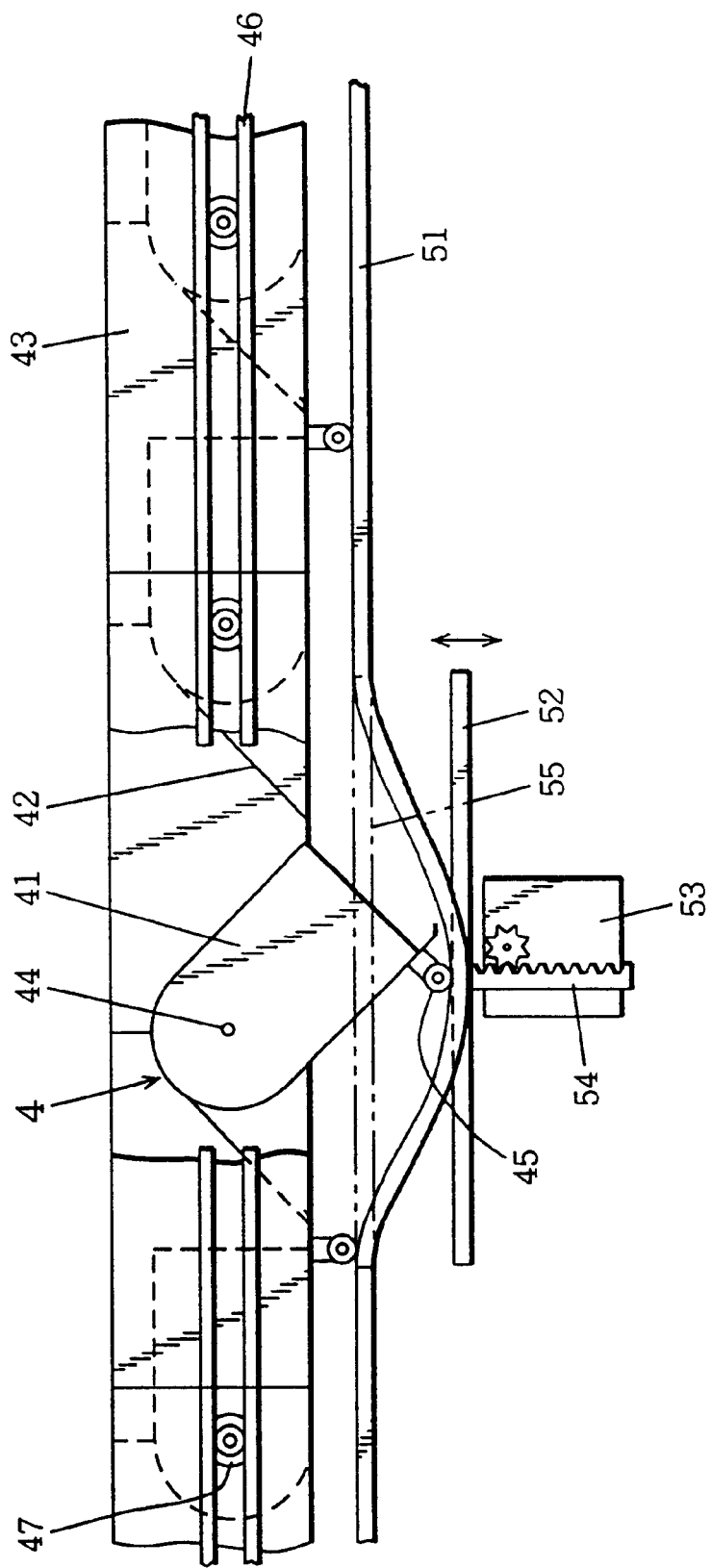
FIG. 9 is a front view partly in of a further another embodiment of the bucket conveyor of this invention.
Figure 10:
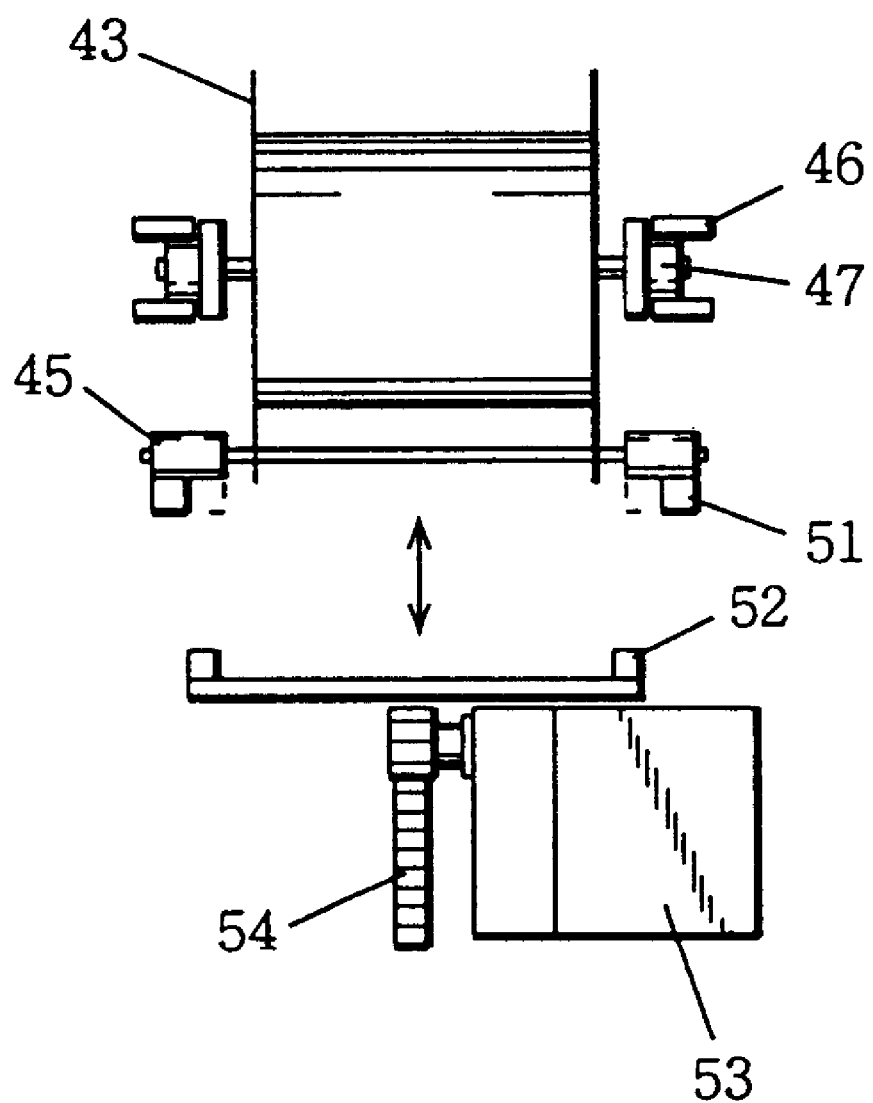
FIG. 10 is a X—X sectional view of FIG. 9.

Referring to FIGS. 9 and 10, with the bucket (4) used on this conveyor, the body (41) and the front end surface (42) can be separated. Aprons (43) are provided separately from side surface of the body (41). The front end surface (42) is fixed to the aprons (43). As in actual embodiment 1, the body (41) is linked to the aprons (43) of the following bucket (4) by a rotating shaft (44). On both ends of the rotating shaft (44), wheels (47) are attached, and the wheels are set on guide rails (46). The guide rails (46) guide the bucket (4) in the direction of conveyance. The bucket (4) has rollers (45) attached to the bottom, forward of the rotating shaft (44).

Below the bucket (4) are laid stationary rails (51) on which the rollers (45) slide. The width of the stationary rails (51) is half that of the rollers (45). The stationary rails (51) are straight in non-unloading positions so as keep the body (41) planar to the direction of conveyance. In the unloading position, the stationary rails (51) fall and rise to form a sinusoidal curve. Accordingly, the rollers (45) descend smoothly by using the aforementioned rotating shaft (44) as a fulcrum when leaving the linear path. The body (41) inclines whereby unloading the contents. After that, the rollers (45) rise again. The body (41) resumes a stable attitude and travels on the linear section of railing. In this way, the body (41) travels smoothly on the stationary rails (51) both while unloading its contents and when not. For this reason, it is not necessary to lower conveyance speed even when unloading the contents.

There are cases when not wanting to unload the contents in the unloading position. For this purpose, mobile rails (52) are provided in the unloading position. The mobile rails (52) are driven by a motor (53) and can be raised and lowered in the vertical direction via a rack gear (54). The mobile rails (52) substitute for the stationary rails (51) in the unloading position, acting as an extension (55) of the linear section of the stationary rails (51). They are positioned next to the extension (55), thus keeping the body (41) planar to the direction of conveyance. On the other hand, when wanting to unload in the unloading position, the mobile rails (52) are lowered away from the position next to the extension (55).

Accordingly, it is possible to freely set whether to unload in the unloading position or not. And, when the mobile rails (52) are equipped in multiple locations, the unloading position can be selected. The rack gear (54) for raising and lowering the mobile rails (52) can be replaced with a ballscrew or cylinder.

Actual Embodiment 4

This embodiment differs from the buckets used in actual embodiments 1 through 3 in terms of bucket shape and coupling means. In the aforementioned three types of conveyors, the rear end surface of the bucket is either curved like a U or a hemisphere and, by press-contacting the front end surface of the following bucket with the rear end surface of the preceding bucket, a gapless connection is made. Accordingly, when the direction of conveyance changes, the front end surface of the following bucket slides on the rear end surface of the preceding bucket, thus causing friction.

The bucket conveyor of this actual embodiment couples preceding and following buckets with hinges, therefore sliding surface area is minimized and it is possible to minimize frictional resistance.

Figure 11:
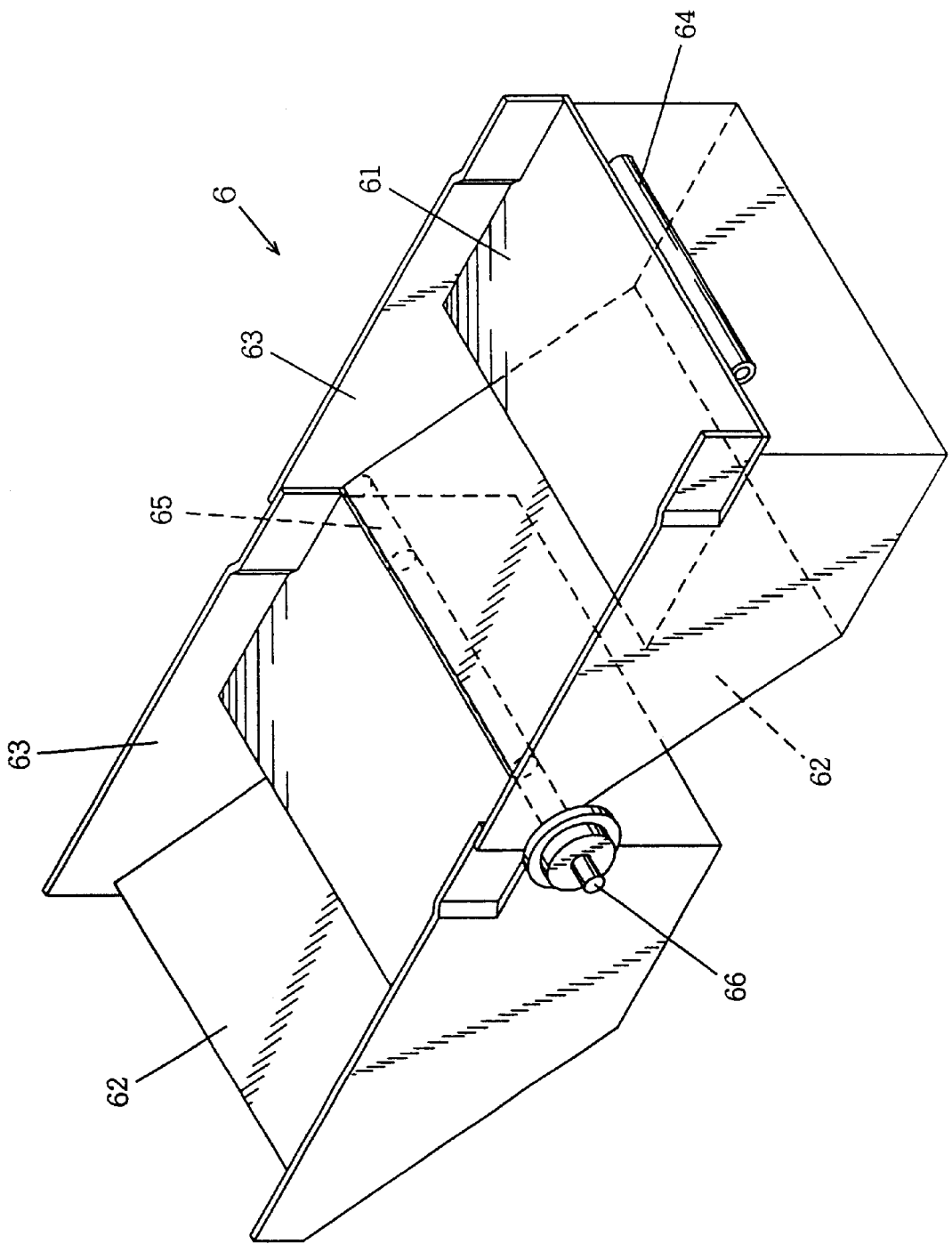
FIG. 11 is a perspective view of the bucket used with a fourth embodiment.

Referring to FIG. 11, with this conveyor, the bucket (6) is shaped like an unequal-legged trapezoid when viewed as a vertical section planar to the direction of conveyance. And its internal volume is the same as with that of actual embodiment 1, which is based on the relation (A+B)24 (A+C). Unlike the aforementioned three actual embodiments however, the front end surface (62) is either welded to the body (61) on the three edges other than the opening edge or is incorporated into a single body with the body (61) from the very beginning. Both sides of the body (61) extend vertically from the opening and serve as aprons (63). This point is the same as on actual embodiment 1.

The bucket (6) has hinge pin holes (64 and 65 respectively) on the rear top edge of the body (61) and the top edge of the front end surface (62). Hinge pin holes (65) are provided on both ends in the shaft direction. The hinge pin hole (64) is concentrically designed so as to be pinched by hinge pin holes (65). The hinge pin holes (64 and 65) complement each other so that their total length in the shaft direction becomes equal to the width of the bucket (6). The hinge pin hole (64) on the preceding bucket and the hinge pin holes (65) on the following bucket form concentric circles and it is possible to securely link the preceding bucket to the following bucket by passing a hinge pin (66) through the holes. The hinge pin (66) serves as the rotating shaft of the bucket (6). Because the bucket (6) is linked by the hinge on the top edge of the front and rear ends, the amount of forward projection of the aprons (63) is slightly less than that in actual embodiment 1.

Figure 12:
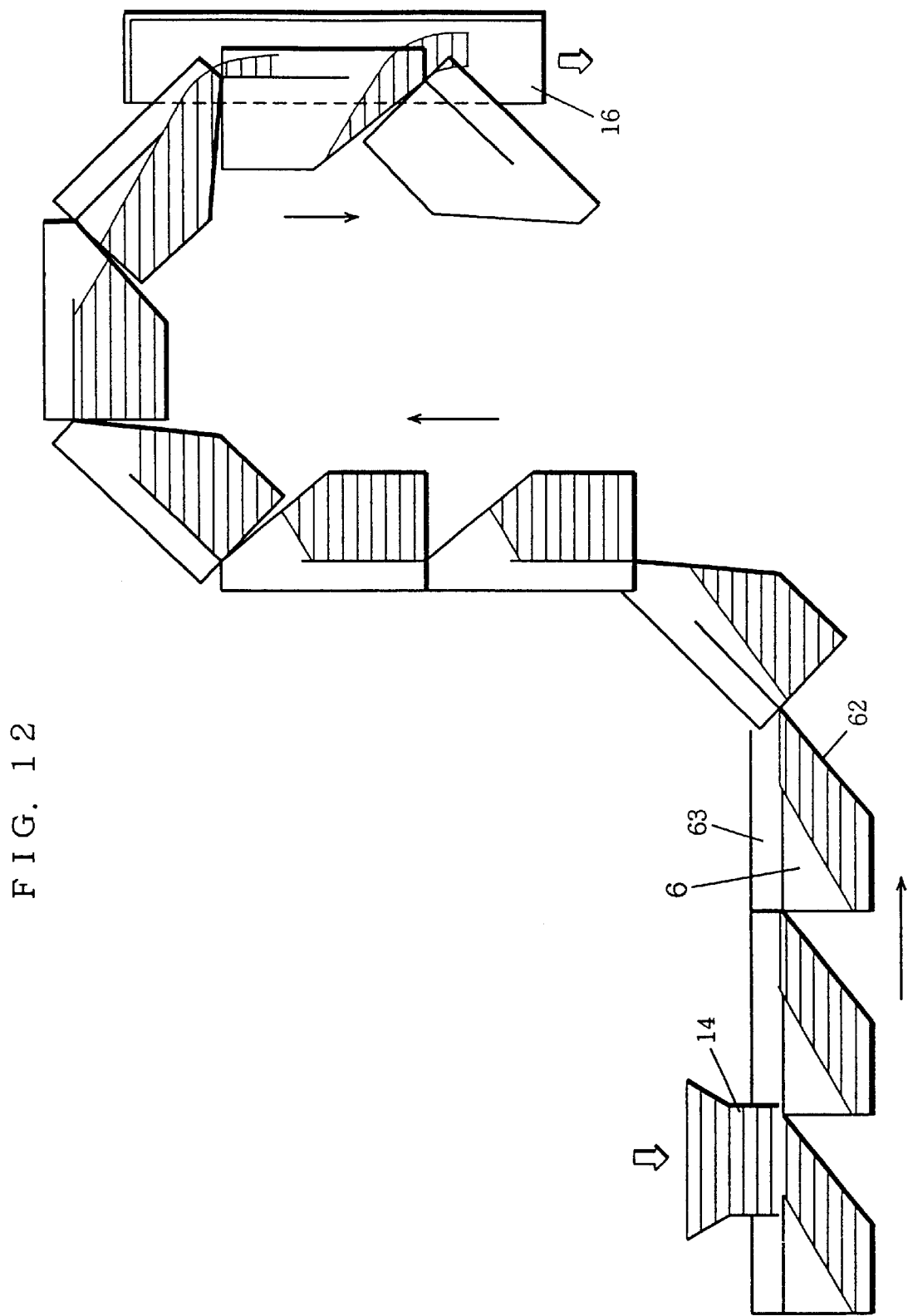
FIG. 12 is a sectional view showing how grain is conveyed using the conveyor.

The following detailed description deals with how rice is conveyed using this bucket conveyor. Referring to FIG. 12, as with actual embodiment 1, a rice loading port (14) is provided above the horizontal conveyance forwarding route sufficiently close to the bucket (6). Rice is loaded continuously into the buckets from the loading port (14). It is not necessary to carefully control loading speed. A small quantity of rice lands on top of the body (61), however it does not fall onto the conveyor floor because the bottom edge of the loading port (14) is lower than the aprons (63). The bucket (6) rotates on a hinge pin (66) to negotiate the direction of conveyance. Accordingly, the rice on the top of the body (61) slides along the top surface and into the following bucket during the vertical conveyance forwarding route. The rice in the bucket (6) is unloaded into an unloading port (16) when the bucket comes in the vertical conveyance returning route which causes the rice to slide along front end surface (62). With this actual embodiment also, rice falls under its own weight both when loaded into the bucket (6) and when unloaded from the bucket (6), therefore the shock applied to the rice is minimal. For this reason, the rice is not damaged.

Actual Embodiment 5

As in Actual Embodiment 3, this is an example of a system where unloading positions can be adjusted at will. However, this model excels over Embodiment 3 in that it does not require a stationary rail.

Figure 13:
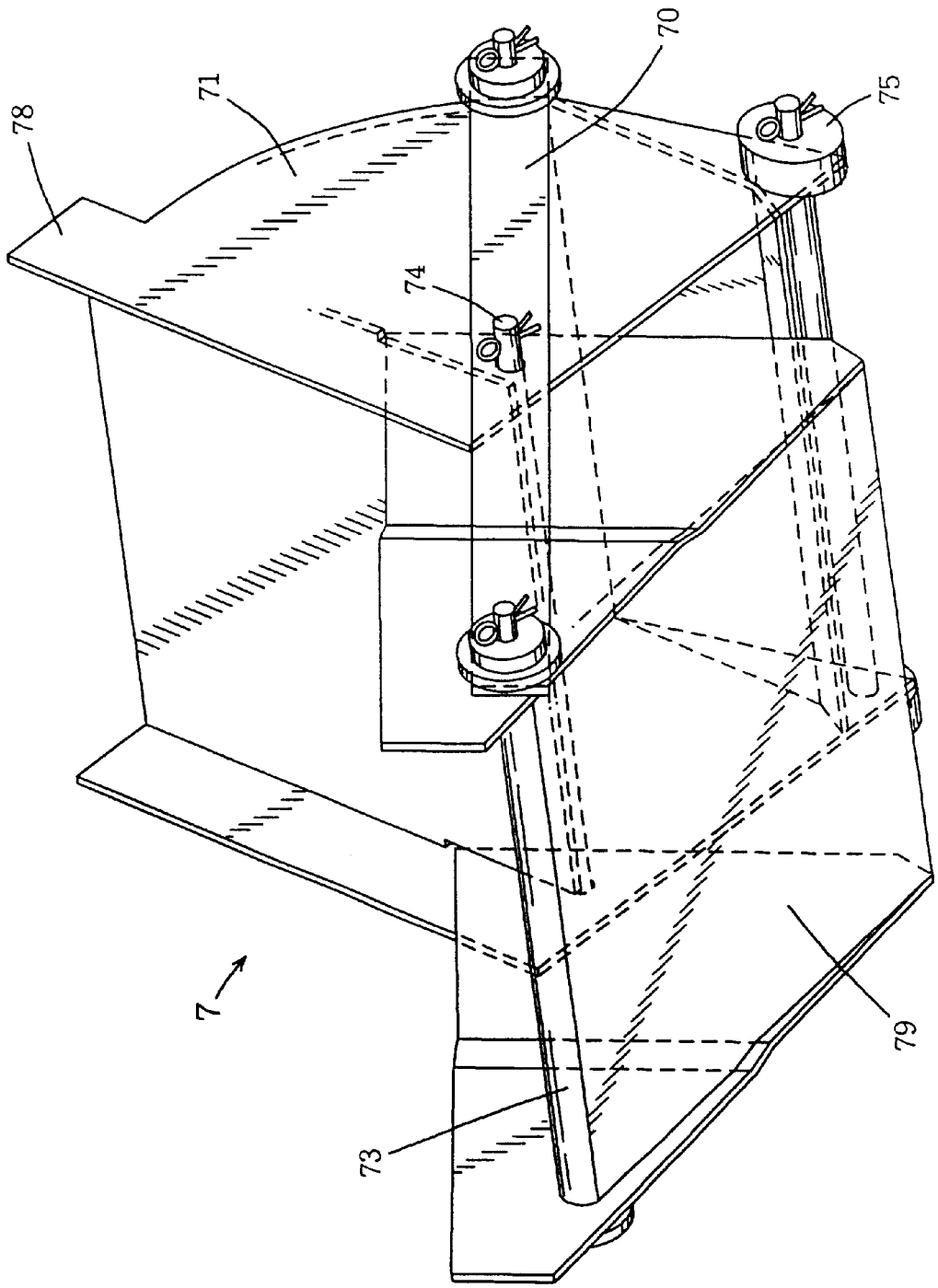
FIG. 13 is a perspective view of the bucket used with a fifth embodiment of the bucket conveyor of this invention.
Figure 14:
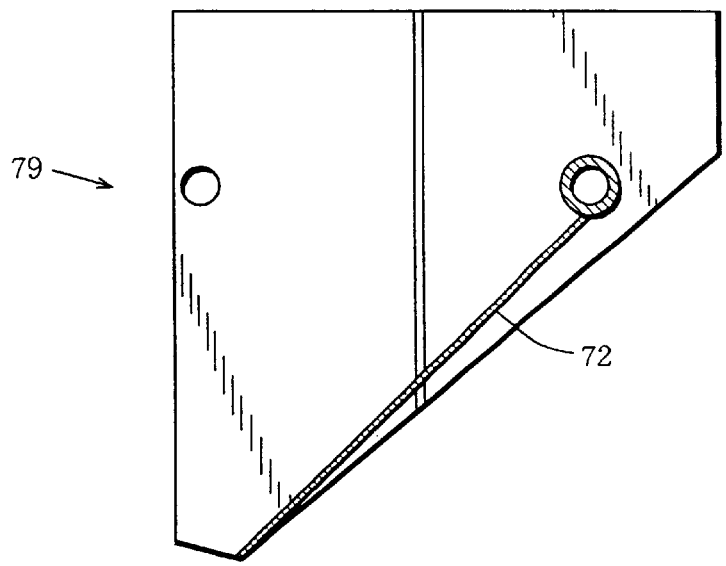
FIG. 14 is a cross-sectional view of the bucket introduction.
Figure 15:
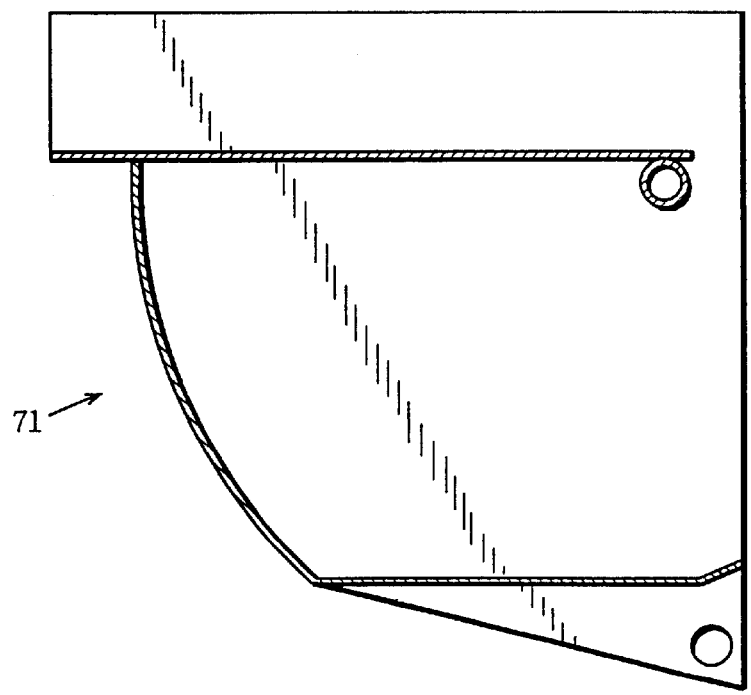
FIG. 15 is a cross-sectional view of the bucket main body.
Figure 16:
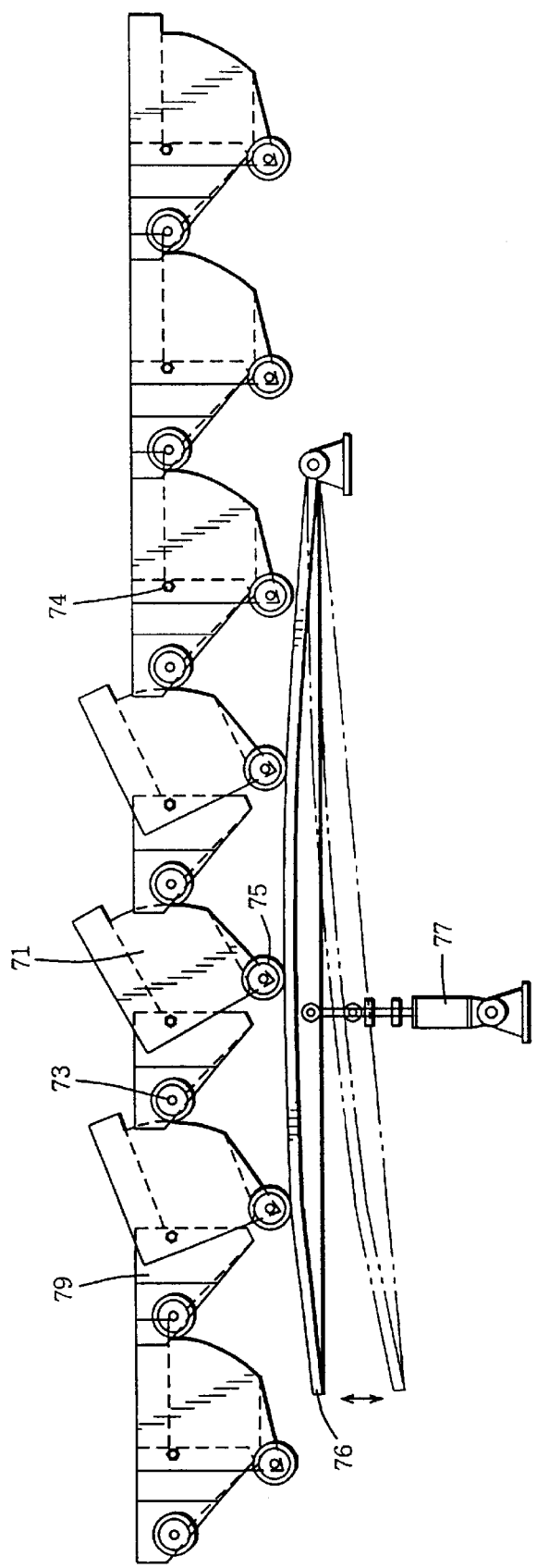
FIG. 16 is a front view of the bucket conveyer.
Figure 17:
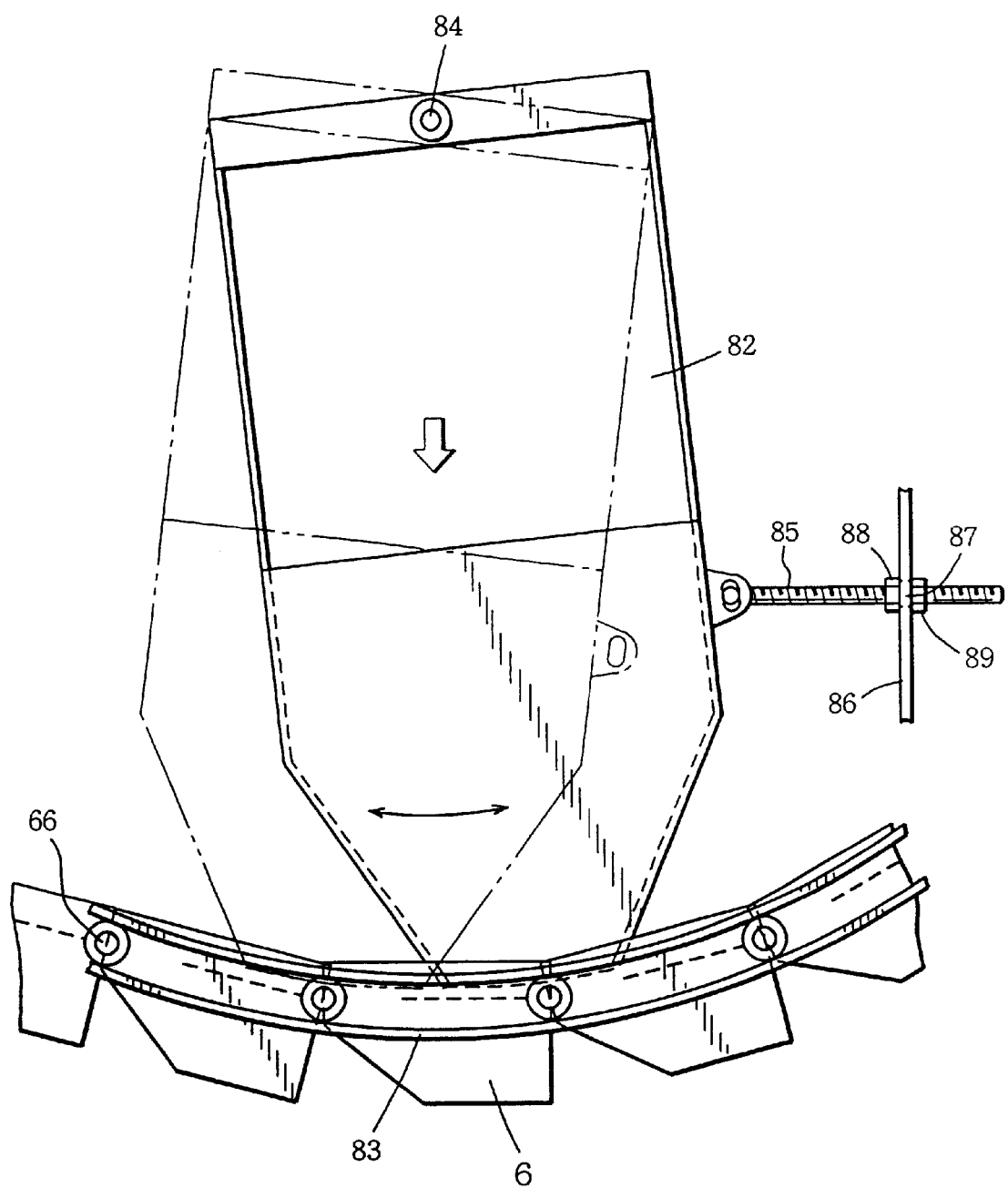
FIG. 17 is a front view of a sixth embodiment of the bucket conveyer of this invention.

Referring to FIGS. 13–15, the bucket (7) is composed of a main body (71) which has a round rear end, and an introduction (79). The introduction (79) has a sloped front end surface (72) and an opening. The body (71) and the introduction (79) are hinged via rotating shaft (74). A wheel shaft (73) is also positioned on the upper edge of front end surface (72) so that it is perpendicular to the direction of conveyance and parallel to the level of bucket opening. At the bottom of the body (71) are rollers (75). Also, on the upper edge of the body (71) a flange (78) is attached which extends toward the back. The flange (78) is supported by the wheel shaft (73) of the following bucket (7) when the body (71) is in its regular position. The guide rail not in the diagram, as in FIGS. 6 and 9, is situated on both sides of the bucket (7) and supports it, guiding it through to the direction of its conveyance. The ends of the wheel shaft (73) jutting out on both sides of the bucket (7) are coupled with the wheel shaft on the following bucket via the bar (70) in order to connect all buckets into a gapless train. The rotating shaft (75) penetrates the bar (70). Therefore, the introduction (79) is fixed onto the bar (70).

Under the level of conveyance of the bucket (7), a swing rail (76) is positioned pivotally on the horizontal conveyance route so it can be moved vertically. When unloading, the swing rail (76) is supported horizontally by a cylinder (77) to form a sinusoidal curve supporting and guiding the bucket base at the unloading position so that the bucket can rotate and dump its contents. Since the swing rail (76) is curved, the rollers (75) move upward on the rail (76) while the wheel shaft (73) travels horizontally. Because of this, the rollers (75) receive opposing force and are delayed behind the wheel shaft (73), with the result that the body (71) rotates around the rotating shaft (74) and unloads contents. After this, the rollers (75) descend curve over the swing rail (76) so that the body (71) then resumes regular angle.

When not unloading, the swing rail (76) is lowered by depressurizing the cylinder (77) and removed from contact with the body bottom, so that the bucket is conveyed suspended from the guide rails via the wheel shaft (73). Since the introduction (79) is fixed onto the bar (70), it will not rotate. Neither will the body (71) rotate by the weight of its load since it is also supported by the guide rails via the rotating shaft (74) and the wheel shaft (73) of the following bucket (7).

The flange (78) acts also as a guide to slide loose grain spilt onto the top surface of the body (71) into the following bucket (7). That is, when the bucket (7) is shifting from planar to perpendicular positions, loose grain lodged onto the top surface of the body (71) slides over the flange (78) down to the introduction (79) of the following bucket (7).

For the swing rail (76) drive force can be supplied either by cylinder or motor in combination with pinion racks, and other known methods.

Actual Embodiment 6

In the previous embodiments, when grain is loaded from above up to or beyond the level of the bucket opening, a dead space results, constituting part of the interior at the rear. The space not filled with loose grains must have a volume being larger than the filled volume immediately below the opening. The volume of this dead space is determined by the grain's angle of repose and the bucket angle. However, angle of repose is characteristic to each grain type and cannot be changed. Depending on the grain type and characteristic, the capacity of this dead space may not fulfill the aforesaid requisite of $(A+B) \geq (B+C)$. The amount of grain fed into each bucket (B+C) is adjusted here by controlling the angles of feeding port and bucket.

The bucket 6 is identical to that in Actual embodiment 4. However, this example includes hopper (82) and guide rail (83). The hopper (82) is situated to be swung in pendulum fashion on the support shaft (84) stationed above the bucket conveyance track. On one side of the hopper (82) one end of the bolt (85) is pivotally attached. The other end of the bolt (85) penetrates hole (87) on a stationary structure (86) such as a wall or frame. The hopper (82) can be fixed at a stationary angle with nuts (88) and (89). The guide rails (83) are on both sides of the bucket (6) and are supporting the wheel shaft(66). The guide rails (83) are straight apart from corners, but is elliptical in the proximity of hopper (82). The radius is smallest directly below the support shaft (84).

The bucket (6) resumes planar position directly below the support shaft (84), When less grain content (B+C) and larger dead space A is desired, the hopper (82) is tilted toward lower right side as shown in solid line, and grain fed onto bucket in downward tilted position. When more grain content (B+C) and less dead space A is desired, the hopper (82) is tilted to lower left, so as to feed grain onto bucket in upward tilted position. In this way, the size of dead space may be adjusted by changing the grain feeder angle.

Note that even though buckets shown in above example are depicted as having parallel upper and lower sides, this need not always be the case.

What is claimed is:

1. A bucket conveyor for conveying loose grain, in which the bucket angle must inevitably change according to the direction of conveyance, said conveyor comprising:

a bucket composed of an introduction and a main body, the introduction having an opening introducing grain into the bucket, the body being rotatably connected to the introduction and having a dead space not filled with grain when grain is loaded from above to or beyond the level of the opening, its volume being larger than the filled volume immediately below the opening;

guide rails located on both sides of the bucket, supporting and guiding it in the direction of conveyance; and a swing rail positioned pivotally in the unloading position on the horizontal conveyance route, said rail forming a sinusoidal curve so as to enable the body to rotate while supporting the body, the swing rail being able to move away from the body.

2. The conveyor of claim 1, wherein the bucket is equipped with a roller at the bottom of the body, said roller being able to contact with the swing rail.

3. The conveyor of claim 1, wherein the bucket is equipped with a wheel shaft jutting out both sides of the introduction, supported by the guide rails via the wheel shaft.

4. The conveyor of claim 1, further comprising another bucket following the bucket, wherein the introduction is linked with the introduction of the following bucket via a bar.

5. The conveyor of claim 3, further comprising another bucket following the bucket, wherein the body has at the upper portion a flange extending backward to rest on the wheel shaft of the following bucket with the aid of the flange.

* * * * *